Figure 1:
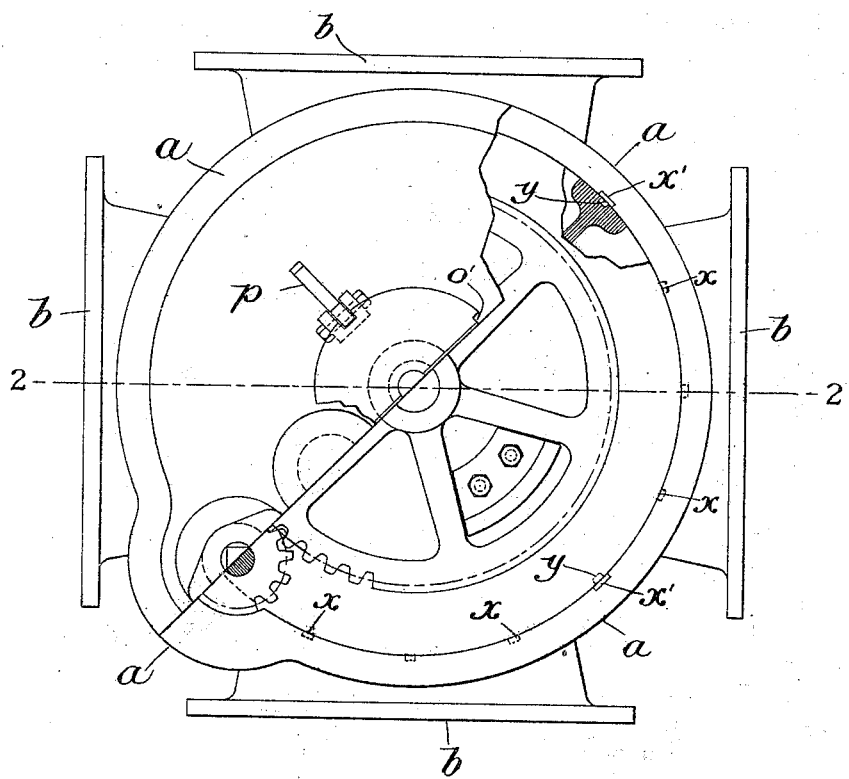

No. 643,393. Patented Feb. 13, 1900.
T. R. BEAL.
GAS WORKS VALVE.
(Application filed Oct. 26, 1897. Renewed Nov. 9, 1899.)

(No Model.) 4 Sheets—Sheet 1.

Witnesses:

Inventor.
Thaddeus R. Beal
by Eunice Goldsborough
Attorneys

No. 643,393. Patented Feb. 13, 1900.
T. R. BEAL.
GAS WORKS VALVE.
(Application filed Oct. 26, 1897. Renewed Nov. 9, 1899.)

(No Model.) 4 Sheets—Sheet 3.

Witnesses:
Inventor
Thaddeus R. Beal
by Attorneys

No. 643,393. Patented Feb. 13, 1900.
T. R. BEAL.
GAS WORKS VALVE.
(Application filed Oct. 26, 1897. Renewed Nov. 9, 1899.)

(No Model.) 4 Sheets—Sheet 4.

UNITED STATES PATENT OFFICE.

THADDEUS R. BEAL, OF NEW YORK, N. Y.

GAS-WORKS VALVE.

SPECIFICATION forming part of Letters Patent No. 643,393, dated February 13, 1900.

Application filed October 26, 1897. Renewed November 9, 1899. Serial No. 736,436. (No model.)

*To all whom it may concern:*

Be it known that I, THADDEUS R. BEAL, a citizen of the United States, residing at New York, in the county of New York and State of New York, have invented certain new and useful Improvements in Gas-Works Valves; and I do hereby declare the following to be a full, clear, and exact description of the invention, such as will enable others skilled in the art to which it appertains to make and use the same.

The invention relates more especially to multi-way rotary plug-valves designed for use in place of the center seals or center valves now commonly employed in connection with the purifying apparatus of gas-works. The ordinary center seals or valves have many disadvantages, especially where large pipes are employed, principally on account of their complex arrangement, the difficulty and expense of making the large castings required, and the practical impossibility of keeping the valves gas-tight. The general type of valve herein illustrated and described has known advantages over these center seal-valves and has been used to some extent; but owing principally to the fact that when the gate or movable valve is coöperating with certain of the valve-seats others of the seats are left exposed and subject to corrosion and injury from impurities deposited thereon by the gas they have not come into general use, for unless the movable part or gate of the valve makes a gas-tight joint with the faces of the several seats leakage results and the waste increasing soon renders the device useless. In the present invention those of the valve-seats that are uncovered or exposed when the valve proper is in certain positions are covered and protected by what I call a "dummy valve," which does not interfere with the free flow of the gas, but whose only function is to cover the faces of the seats which would otherwise be exposed and which effectually prevents any corrosion or deposit on their faces such as would prevent the gate from making a perfectly gas-tight contact therewith. Ancillary to this feature the invention also contemplates the liquid-sealing of the valve-joints, (preferably with oil,) so as to insure their perfect gas-tightness, and other features of minor importance are the manner of supporting the movable valve and relieving the seats of its weight in connection with this oil-sealing of the joints and the means for operating the valve-gate and other moving parts.

The invention is fully illustrated in the accompanying drawings, wherein—

Figure 2:
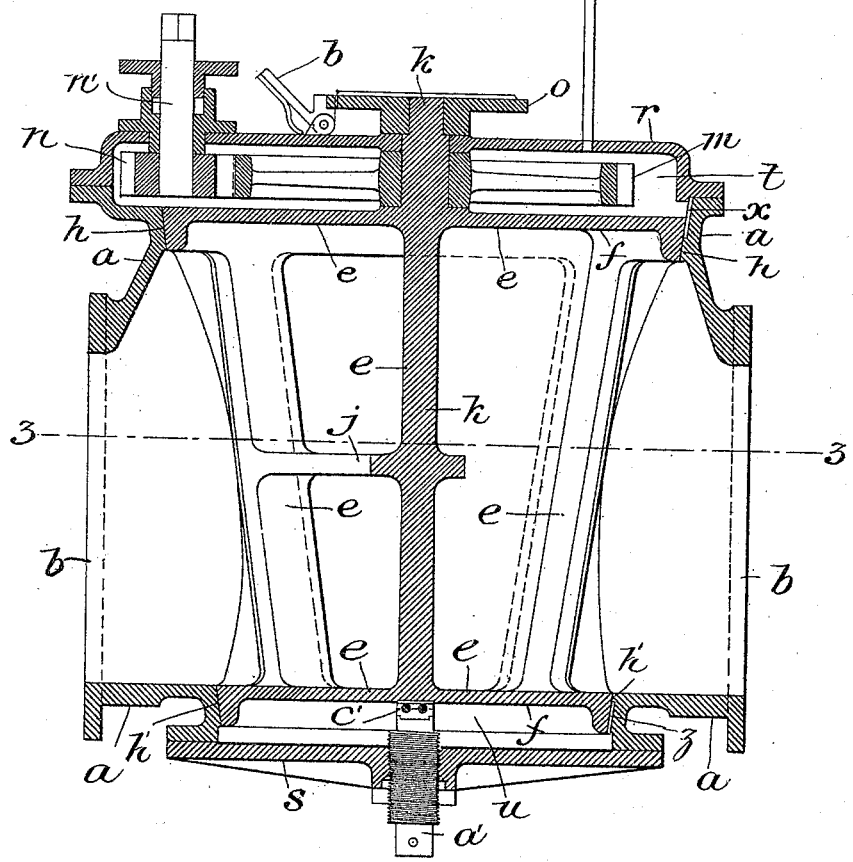
Figure 3:
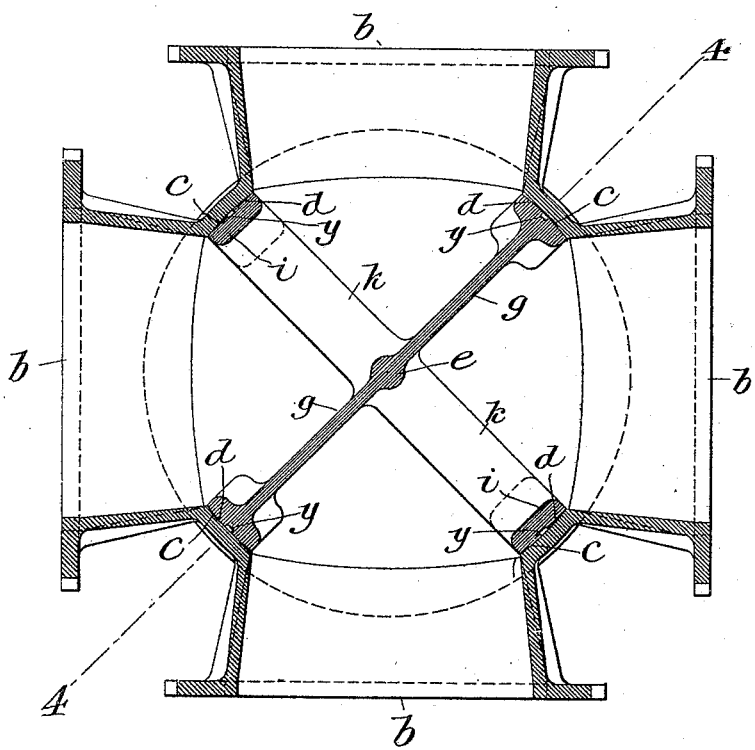
Figure 4:
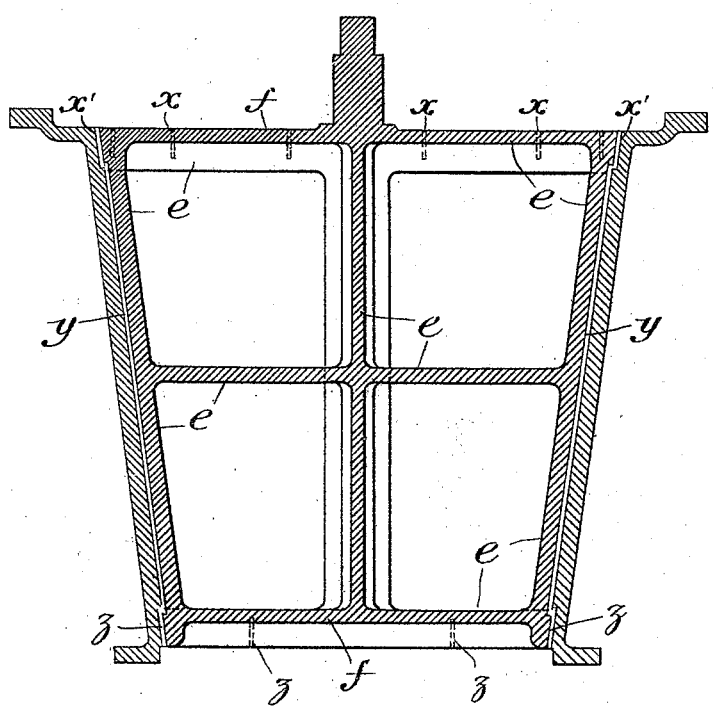

Figure 1 is a plan view of the entire valve, part of the top casing being broken away to show the arrangement of parts under the same. Fig. 2 is a vertical central section of the valve on the line 2 2 of Fig. 1. Fig. 3 is a horizontal section of the valve on the line 3 3 of Fig. 2, and Fig. 4 is a vertical section of the valve on the line 4 4 of Fig. 3.

Referring to the views, $a$ denotes the casing, with respect to the form and exterior contour and arrangement of which the present invention is not concerned.

The letters $b$ indicate the pipes leading into and from this casing, of which there are only four shown, but of which there may be two less or any number greater than four. The pipes are arranged at angles one to another, the particular inclination of which will depend largely on the number of pipes employed, as they all radiate from the casing. At the apexes of these angles, on the inside of the casing, are the stationary valve-seats $c$, of which there are four shown in the drawings. Coöperating with these seats are the faces $d\ d$ of a rotary plug-valve $e$, the seats being arranged in a circle at appropriate intervals around the interior of the casing and being themselves slightly concaved horizontally, so that the frame of the rotary valve $e$, which is circular, may revolve within them and have the faces $d\ d$, which are slightly convexed, fit them all accurately as the plug turns. The construction of this valve is best shown in Figs. 2 and 4, which are vertical sections of it, taken at right angles to each other. In these views the valve will be seen to consist of upper and lower imperforate circular plates or heads $f\ f$ and an imperforate gate $g$, which constitutes the valve proper and which unites the heads together and extends diametrically across them and the circular opening between the valve-seats, so as to divide the interior of the casing into two parts, into one of which two of the pipes lead and into the other of which the other two pipes lead. At the top of the casing there is an annular rim or surface $h$, which is continuous all around the inside of the casing and which forms a seat or bearing for the upper head of the valve and makes with its edge a gas-tight joint. At the lower end of the casing there is a similar annular rim or surface $h'$, which forms a bearing or seat for the bottom plate of the valve. These two annular surfaces are located in the casing, the one above the openings of the pipes and the other below the pipe-openings, so that when the valve is in place the interior of the casing constitutes a gas-tight chamber with which all the pipes communicate. On further reference to Figs. 2 and 4 it will be seen that the head-plate of the valve is of greater diameter than the bottom plate and that the annular seats $h\ h'$ have the same relation as to diameter, the effect of which is to give the interior space of the casing and the valve itself a downwardly-tapering form. As before described, the stationary valve-seats are located at points around the interior of this casing between adjacent openings. This is best shown in Fig. 3, and from Fig. 4 it will be seen that these seats extend vertically in an inclined direction from the upper rim $h$ to the lower rim $h'$. On the vertical edges of the gate $g$ are the faces $d\ d$, heretofore referred to, and it will be understood from the preceding description of the movable valve that this part of the valve is adapted to coöperate with all the stationary seats in the casing, but that in any given position of the valve the faces $d\ d$ will only bear against the diametrically opposite ones of the seats $c$, and that the other seats will be exposed, unless some other provision be made for covering and protecting them at such time. In whatever position the movable valve may be the gas entering the casing through one pipe is directed by the gate into the adjacent pipe, and in flowing through the casing must pass across the face of the stationary seats that for the time being are not covered by the faces $d\ d$ of the gate, and in the operation of the valve it soon results that these seats become corroded and covered with impurities that prevent the faces from making gas-tight joints therewith, as heretofore explained. To prevent this destruction of the seat-faces, I provide the movable part of the valve with what for want of a better term I call "dummy valves" $i\ i$, but which are really nothing more than shields or covers for those valve-seats that except for such covers would be exposed when the valve proper is coöperating with the other seats. These dummy valves have a fixed relation with the movable gate and consist of flat plates or bars located diametrically opposite each other and equidistant between the faces $d\ d$ and at a distance from each face exactly equal to the distance between the stationary seats. The shields $i\ i$ extend from the head-plate of the valve to the foot-plate and are further supported by arms $j$, projecting from the shaft or axis $k$ of the gate, about centrally of its length, leaving the space between them and the gate free for the unobstructed flow of the gas, but entirely covering the faces of the seats. Such is the construction and operation of the movable part of the valve. It is preferably made in a single casting and of a tapering plug-like form, the dummy valves being carried by a sort of skeleton frame rigid therewith. As thus constructed it is seated to revolve in the bearing-rims at the top and bottom of the tapering interior space of the casing and has its shaft $k$ extended upward through the top or cover $l$ of the casing, as shown in Fig. 2.

The means for moving the valve are clearly shown in Figs. 1 and 2, where $m$ indicates a large gear-wheel rigid with the shaft of the gate, and $n$ denotes a power-pinion journaled in the casing and meshing with the gear, the relation of the pinion to the gear being as one to four. The shaft of the pinion is denoted by $n'$, and it extends up and out through the top of the casing, as shown in Fig. 2, and its end is squared or otherwise adapted for the temporary attachment of a hand-crank. The shaft of the gate is provided outside the cap of the casing with a disk $o$, provided with notches $o'$, into any of which is adapted to engage a spring-latch $p$ on the casing-top. The object of this notched disk and latch is to lock the gate in any of its positions, and the notches are so located that when the latch engages them the movable valve will be on one or another of its seats.

In order to insure that the joints between the movable parts of the valve and the stationary seats and rims in the casing shall be gas-tight, I provide for sealing them with liquid (preferably oil) in the following manner: The head and bottom plate make, as before explained, gas-tight joints with the upper and lower annular rims above and below the pipe-openings and, together with the top plate or cap $r$ of the casing and the bottom $s$ of the same, form closed chambers $t$ and $u$, respectively, above and below the working parts of the valve. I utilize these chambers as receptacles for the oil to seal the joints and also for the purpose of lubricating the gearing for moving the gate and the antifriction-bearings on the adjustable support at the bottom, this gearing and bearings being entirely inclosed in the respective chambers and being thus arranged to run in oil.

For the purpose of filling the upper chamber with oil and obtaining the necessary pressure to effectually seal the joints I preferably provide an elevated cup $v$, and for the purpose of supplying the joints with oil I form in the annular rim $a$ a number of grooves $x$, which are open at the top and in constant communication with the oil-chamber $t$, but are closed at the bottom, or, in other words, do not extend the entire depth of the rim. There may be any number of these grooves, and they may be arranged, so far as sealing the joint between the head and the rim is concerned, at any desired points and either in the rim or on the exterior surface of the edge of the head-plate, or both, and the effect is to smear the surfaces of the rim and the head-plate with oil as the valve moves and keep the joint or minute space between them filled and sealed with the liquid. For the purpose of sealing the joints between the spaces $d$ of the working parts of the valve and the stationary seats $c$ it is essential that certain of these grooves be arranged in the rim in line with the seats and that they extend below the ends of those grooves in the rim proper, as shown at $x'$, and I provide the entire length of the faces $d$ of the gate with similar grooves $y$, the upper ends of which extend above the lower ends of the grooves $x'$, but do not extend above the rim $h$ or communicate directly with the oil-chamber and never communicate with the oil-chamber at all except when they register with the lengthened grooves $x'$ on the seats $c$.

The arrangement just described seals the joints between the movable and stationary parts in the upper portion of the valve-casing, and in order to seal that between the bottom plate and the rim $h'$ I provide the latter with upwardly-extending grooves $z$, precisely like those lettered $x$ in the upper rim, into which the oil in the chamber $u$ may rise, and in order to get the oil from the upper chamber into the lower one I make the grooves $y$ in the faces of the gate and the dummy valves $i$ extend below the upper ends of those of the grooves $z$ which are in line with the stationary seats, so that when the upper ends of the grooves $y$ register with the grooves $x'$ there will be a free passage for the oil along the faces of the valve and its seats down to the lower chamber, permitting the oil to pass down and fill the latter. It will be understood from this description that when the valve is on either of the seats there is oil supplied to the meeting faces of the parts and that the communication between the grooves in the face of the movable parts and both oil-chambers is cut off immediately on the valve leaving the seat, so that there can be no leakage or waste of oil from the upper chamber while the valve is moving from one seat to another. The faces of the dummy valves or seat-covers $i$ are grooved in precisely the same way as those of the valve proper.

In connection with the tapering form of the valve and its bearings and seats and the oil-sealing of the joints I provide an adjustable support for the entire movable structure of the valve, such support consisting of a step-bearing $a'$, tapped into the bottom of the valve-casing, and an antifriction or ball bearing $c'$ between the support and the valve. As will be understood, the valve is very heavy and presses with great force outwardly on the tapered bearings and seats, making it difficult to handle quickly, and such great pressure at the joints being really unnecessary, especially when the joints are oil-sealed, I am enabled by this means to make such fine adjustments of the movable parts that the stationary seats and bearings are relieved of the weight and yet to have the parts in contact with one another or if not in actual physical contact then in such intimate proximity that the capillarity of the minute space between them will hold the oil film against dislodgement by pressure of the gas and produce a perfectly gas-tight joint or connection.

Such being the construction and general operation of the parts, no further description of either seems necessary, except, perhaps, to state that although the only construction illustrated and described herein is a circular four-way valve the improvements claimed are applicable to any other form of valve having the same general characteristics and that I do not desire or intend to be limited to the particular constructions and arrangements of parts herein set forth.

The elevation of the oil-cup $v$ provides a convenient means for obtaining the necessary head or pressure of oil to insure that it finds its way between the valve-faces even though the valve may be in operation at the time and also to prevent the dislodgement of the oil-film seal either by the gas-pressure within the casing or otherwise, and for that purpose the pressure of the oil is preferably made superior to that of the gas.

Having first described my invention, I hereby declare that what I claim as my invention, and desire to secure by Letters Patent, is—

1. In a gas-works valve, the combination of a stationary seat, a movable valve adapted to coöperate therewith, a source of oil-supply, and grooves or depressions in the face of the movable valve, said grooves or depressions communicating with the oil-supply when the valve is on the seat and the communication being cut off when the valve leaves the seat.

2. In a gas-works valve, the combination of a plurality of stationary seats, a movable valve adapted to coöperate with either of said seats, a source of oil-supply communicating with grooves or depressions in the face of one of the parts, and means for closing said communication while the valve is moving from one seat to another.

3. In a gas-works valve, the combination with the casing, of a plurality of stationary seats, a movable valve adapted to coöperate with either of said seats, an oil-chamber in the casing, and grooves or depressions in the valve and seat, those in the seat being in open communication with the oil-chamber, and being adapted to communicate with that in the valve when the latter closes on the seat.

4. In a gas-works valve, the combination with the casing, of a plurality of seats annularly arranged at intervals therein, a rotary plug-valve having a face adapted to coöperate with any of said seats, a gear-wheel rigid with the valve and housed in said casing, a power-pinion meshing with said wheel and housed and journaled in said casing with its shaft projecting therethrough, a disk on the shaft of the valve outside the casing, notches in said disk corresponding to the number of valve-seats within the casing, and a latch adapted to engage said notches.

5. In a gas-works valve, the combination with the casing and pipes leading into and from the same, of a plurality of stationary vertical valve-seats arranged within the casing, a sliding valve consisting of horizontal plates coöperating with bearing-faces in the casing above and below the pipe-openings, and a vertically-arranged valve extending between the plates and having a face adapted to coöperate with any of the seats, chambers in the casing above and below the horizontal plates of the valve and their bearing-faces, grooves or depressions in the valve-seats in open communication with said chambers, and a similar groove or depression in the face of the movable valve, the groove in the face of the valve being adapted to register with those in the seats when the valve is seated thereon so as to establish communication between the upper and lower chambers when the valve is closed in any position.

In testimony whereof I affix my signature in presence of two witnesses.

THADDEUS R. BEAL.

Witnesses:
FREDERICK W. FLOYD,
J. A. GOLDSBOROUGH.